US008696071B2

(12) United States Patent
Root et al.

(10) Patent No.: US 8,696,071 B2
(45) Date of Patent: Apr. 15, 2014

(54) END OF TRAIN DEVICE FOR ECP TRAINS

(75) Inventors: Kevin B. Root, Black River, NY (US); Dale R. Stevens, Adams Center, NY (US); Anthony W. Lumbis, Watertown, NY (US); Alexander G. Perry, Gananoque (CA)

(73) Assignee: New York Air Brake Corporation, Watertown, NY (US)

( * ) Notice: Subject to any disclaimer, the term of this patent is extended or adjusted under 35 U.S.C. 154(b) by 2321 days.

(21) Appl. No.: 11/613,239

(22) Filed: Dec. 20, 2006

(65) Prior Publication Data

US 2008/0149781 A1    Jun. 26, 2008

(51) Int. Cl.
*B60T 15/46* (2006.01)

(52) U.S. Cl.
USPC .......................................................... 303/47

(58) Field of Classification Search
USPC .................................. 303/47, 7, 20; 320/162
See application file for complete search history.

(56) References Cited

U.S. PATENT DOCUMENTS

| | | | |
|---|---|---|---|
| 5,647,562 A * | 7/1997 | Lumbis et al. | 246/167 R |
| 5,673,876 A | 10/1997 | Lumbis | |
| 5,681,015 A | 10/1997 | Kull | |
| 5,873,638 A | 2/1999 | Bezos | |
| 6,095,618 A | 8/2000 | Hencka et al. | |
| 6,102,491 A | 8/2000 | Bezos | |
| 6,227,625 B1 | 5/2001 | Gaughan | |
| 6,229,452 B1 * | 5/2001 | Kull | 340/3.51 |
| 6,275,165 B1 * | 8/2001 | Bezos | 340/3.44 |
| 6,322,025 B1 * | 11/2001 | Colbert et al. | 246/167 R |
| 6,375,276 B1 * | 4/2002 | Delaruelle | 303/7 |
| 6,839,664 B1 | 1/2005 | Kull | |
| 7,029,077 B2 * | 4/2006 | Anwar et al. | 303/152 |

FOREIGN PATENT DOCUMENTS

EP    1 016 575 A2    7/2000
EP    1 162 120 A2    12/2001

* cited by examiner

Primary Examiner — Xuan Lan Nguyen
(74) Attorney, Agent, or Firm — Barnes & Thornburg LLP

(57) ABSTRACT

An end of train device for an electrically controlled pneumatic brake system includes a radio transceiver, a brake pipe sensor, a brake pipe valve, a manual switch and a first controller controlling the radio transceiver and the valve. It also includes a wire transceiver for wire communication over a train line and a second controller connected to and controlling the wire transceiver. The first and second controllers are connected to each other and control the radio transceiver to be active when the wire transceiver is active. Two batteries are provided with an improved power management circuit to individually charge the batteries.

18 Claims, 3 Drawing Sheets

* EOT – FOR WIRELESS EOT CIRCUITRY
** ECP – FOR ECP PCB
*** ECP ACTIVATE 'OPEN' COMMAND IN SERIES WITH BP PSI SWITCH

* EOT – FOR WIRELESS EOT CIRCUITRY
** ECP – FOR ECP PCB
*** ECP ACTIVATE 'OPEN' COMMAND IN SERIES WITH BP PSI SWITCH

END OF TRAIN DEVICE FOR ECP TRAINS

BACKGROUND AND SUMMARY OF THE DISCLOSURE

The present system relates generally to end of train device (EOT) and more specifically to an end of train device for trains having electrically controlled pneumatic (ECP) brake systems.

A combined ECP/EOT end of train device functions to provide RF and/or train line wire communication of pertinent information from the rear to the head end or front of a train. RF mode of transmission of the EOT is that of radio frequencies either in single-directional or two-way communication with a Cab Display Unit (CDU). The RF operation is well known in the rail industry as specified by the Association of American Railroads (AAR) and which some aspects are specified by the Federal Railway Administration (FRA). The standard end of train device is attached to the last car in a train. It includes a battery, a blinking light, a brake pipe pressure sensor, an emergency valve connected to the brake pipe and the RF transceiver.

Train line wire operation, known to the industry as Electrically Controlled Pneumatic (ECP) system, is also known and specified by the AAR. The ECP device on the car is part of a network which includes a transceiver which communicates on the train line and a battery which is charged by the train line. As specified by AAR, the node is activated at a predetermined voltage on the train line and establishes communication with a head end unit (HEU).

While the use of an ECP device at the end of the train to assure safe activation of the high voltage on the train line is shown by U.S. Pat. No. 5,673,876, combined ECP/EOT are shown by U.S. Pat. Nos. 5,873,638 and 6,102,491.

The present end of train device for an electrically controlled pneumatic brake system includes a radio transceiver, a brake pipe sensor, a brake pipe valve, a manual switch and a first controller controlling the radio transceiver and the valve. It also includes a wire transceiver for wire communication over a train line and a second controller connected to and controlling the wire transceiver. The first and second controllers are connected to each other and control the radio transceiver to be active when the wire transceiver is active.

The first controller activates the wire transceiver in response to EPC command signals from at least one of the radio transceiver and the wire. The first controller deactivates the wire transceiver in response to EPC command signals transceiver in response to EPC commands and the second controller maintains the radio transceiver active if a minimum pressure is sensed in the brake pipe.

The first controller activates the wire transceiver in response to EPC command signals from the second controller which is in response to at least one of the radio transceiver receipt of EPC commands and the manual switch. The first controller deactivates the wire transceiver if the EPC command signals from the second controller are in response to the manual switch and an EPC active wire is not detected by the first controller after a preset time period.

The first controller activates and deactivates the wire transceiver in response to EPC commands and the second controller activates the radio transceiver when the wire transceiver is activated if the radio transceiver is not activated and maintains the radio transceiver active if a minimum pressure is sensed in the brake pipe after the wire transceiver is deactivated.

The second controller activates the valve to connect the brake pipe to atmosphere in response to an emergency signal from at least one of the radio transceivers and the first controller which is responsive to the emergency signal from the wire transceiver.

The end of train device includes a pair of batteries connected to a power source terminal for the end of train device; and a power management circuit controlling individually the charging of the batteries from the train line when the end of train device is connected to the train. The power management circuit monitors the voltage and current of each battery. The power management circuit individually isolates the batteries from the power source terminal. The power management circuit includes a power converter connecting the train line and the power source terminal. The power converter may be adapted for train line voltages and public utilities voltages.

These and other aspects of the present device will become apparent from the following detailed description of the invention, when considered in conjunction with accompanying drawings.

DETAILED DESCRIPTION OF THE PREFERRED EMBODIMENTS

Figure 1:
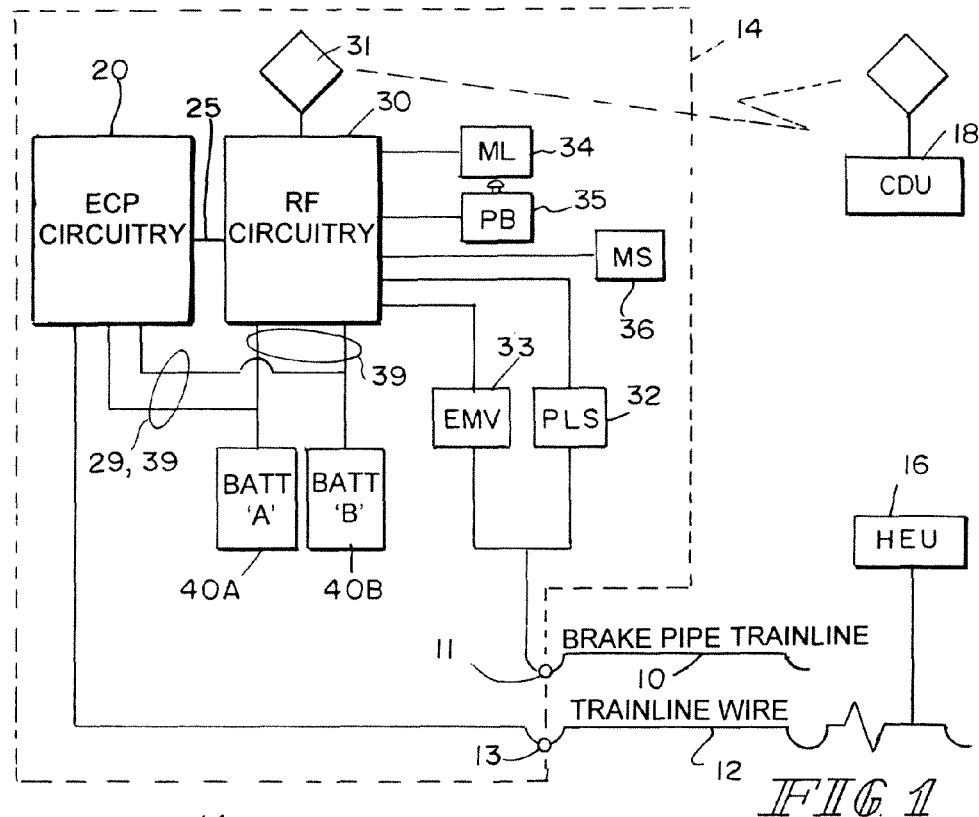
FIG. 1 is a block diagram of an end of train device for ECP trains according to the present disclosure.

An ECP train with an EOT device is illustrated in FIG. 1. The train includes a brake pipe 10 and a train line wire 12. A combined ECP/EOT 14 is connected to the brake pipe 10 via connector 11 and is connected to the train line wire 12 via connector 13. The ECP system includes a Head of End Unit HEU 16 which provides power and communicates over the train line wire 12 to the individual cars in the train. The RF or EOT circuitry 30 of the ECP/EOT 14 communicates to a cab display unit CDU 18. As is well-known in the industry, the ECP/EOT 14 is connected to the last car of the train.

The ECP/EOT 14 includes an ECP circuitry 20 and an RF circuitry 30 which are interconnected and communicate with each other via 25. The connection 25 may be, for example, an RS-232 connection. A pair of batteries 40A and 40B are provided in of the ECP/EOT 14 to power the ECP circuitry 20 and the RF circuitry 30 when power is not received over the train line wire 12. Also the batteries 40 are charged by the power on the train line wire 12.

The standard end of train EOT device includes the RF/EOT circuitry 30 which includes an RF transceiver communicates by antenna 31 with the CDU 18. It also includes a pressure level sensor 32 connected to the brake pipe line 10 and an emergency magnetic valve 33 also connected to brake pipe 10. The pressure level sensor 32 may be a transducer or a pressure switch responsive to a predetermined level of pressure. As is well-known in the prior art, the RF circuitry 30 of the EOT device is generally only active when a predetermined pressure is in the brake pipe 10. Standard circuitry also includes a marker light 34, a test pushbutton switch 35 and a motion sensor 36.

The RF circuitry 30 controls emergency magnetic valve 33 to connect the brake pipe 10 to atmosphere to create an emergency brake application throughout the train from the end of the train. RF circuitry 30 also transmits to CDU 18 signals from a motion sensor 36, brake pipe pressures sensed by sensor 32, as well as other signals known in the industry.

The batteries 40 are connected to the RF circuitry 30 and the ECP circuitry 20 by power lines 39 and are controlled from the ECP circuitry 20 by power lines 29.

Figure 2:
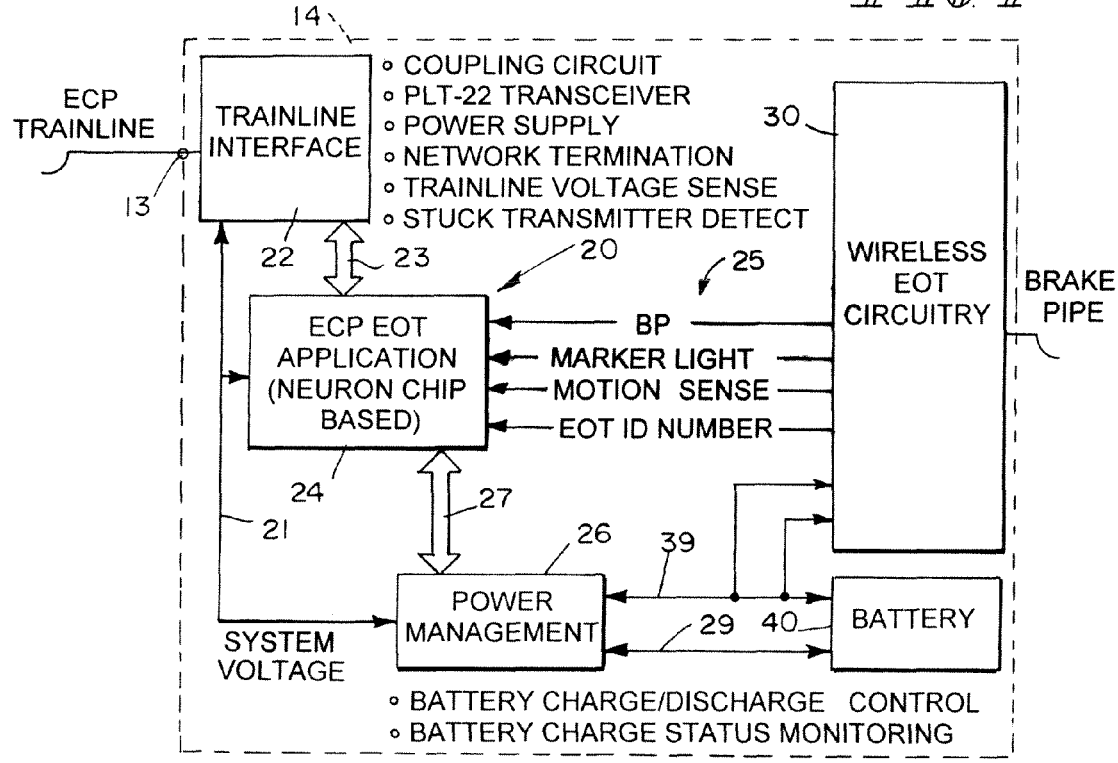
FIG. 2 is a block diagram of the functional elements of the end of train device for ECP trains according to the present disclosure.

A further diagram of the interconnection of the elements of the ECP/EOT 14 is illustrated in FIG. 2. The ECP circuitry 20 includes a train line interface 22 connected via 23 to an ECP/EOT application device 24. The ECP/EOT application device 24 is connected via 27 to the power management circuit 26. The power management circuit 26 is connected to the battery 40 via lines 29 and 39. The battery is also connected via 39 to the RF circuitry 30. As noted in detail, the interconnection 25 between the ECP/EOT application device 24 and the RF circuitry 30 includes the brake pipe pressure, marker light motion sensor and end of train ID number. As will be described below, this information is transmitted by the ECP/EOT application device 24 back to the HEU over the train line wire 12.

The train line interface 22 provides a supply of voltage on line 21 to the ECP/EOT application device 24 and the power management circuit 26.

The train line interface device 22 includes a coupling circuit, a transceiver, a power supply connection network termination, train line voltage sensor and a stuck transmission detector. The ECP/EOT application device 24 is a neuron chip which allows communication on the network of the train line. The power management circuit 26 controls charging and discharge of the battery 40 and monitors the battery charge status. This information is used by the ECP/EOT application device 24, as well as being transmitted back to the HEU 16. For detailed explanation of the train line interface 22 reference is made to U.S. Pat. No. 5,673,876, which is incorporated herein by reference.

The combined ECP/EOT 14 primary operation is that of EOT function. EOT operation is active and maintains activity throughout ECP operation. The RF circuitry 30, in EOT function only, needs to carry its power source throughout its span of operation. The source shown is batteries 40 or charge storage. Because the power storage has the limitation of time and consumption, the EOT function is specifically arranged to preserve energy. Thus whenever possible the EOT circuitry 30 will enter a power saver mode either shutting power off or minimizing usage such as the termination of RF communication.

Subsequently, EOT operation is activated by the presence of pressure within the brake pipe 10 as detected by pressure level sensor (PLS) 32 to the RF circuitry 30. EOT operation may also be activated without pressure within the brake pipe train line 10 by the manual depression of a pushbutton (PB) 35. On activation, the RF circuitry 30 immediately starts single-directional communication via antenna 31. The EOT circuitry 30 simply broadcasts a message with data pertinent to its sensory detectors that includes a unique identification number as assigned by the industry. Any CDU 18 within range may interpret the data by simply setting the unit to the unique identification number.

Two-way communication with a particular CDU 18 is established by an operator momentarily depressing PB 35 and a secondary operator acknowledge at the CDU 18. This is known as "arming" in the industry. Arming allows a CDU 18 to send a message via RF to a particular EOT to initiate its emergency sequence. The RF circuitry 30 on receipt of an emergency from the CDU 18 activates the emergency valve (EMV) 33 that connects brake pipe 10 to atmosphere or exhaust that results in a rapid drop of pressure.

An EOT may re-enter its power saver mode on the reduction of pressure within the brake pipe 10 followed by a specific time interval.

The wire train line communication or ECP function is overlaid on that of the EOT. To function in ECP, the EOT function must be activated. The ECP circuitry 20 is normally powered from the train line wire 12. However, the ECP circuitry 20 must operate for a minimum time on the loss of power from the train line wire as specified by the AAR and under the specific test purpose of this disclosure. Therefore the battery 40 is necessary. The battery 40 is charged from the train line wire power, again as specified by the AAR. The battery 40 is the same source for the RF circuitry 30 as the ECP circuitry 20. Thus in ECP operation and as long as the train line wire 12 power is applied, the battery charge is maintained providing unlimited operation time of the combined ECP/EOT 14.

ECP operation is activated by the presence of power on the train line wire 12, specified by the AAR, as sensed by the ECP circuitry 20. On activation, the ECP circuitry 20 immediately starts single-directional communication over the train line wire 12 with data pertinent to its sensory detectors as well as that available from the RF circuitry 30. The ECP circuitry 20 receives pertinent information from an active RF circuitry 30 over serial link 25. When the RF circuitry 30 was not active due to time-out at low pressure level sense 32 within the brake pipe 10, the ECP circuitry 20 activates the RF circuitry 30 to full EOT function. The ECP circuitry 20 will respond immediately to any incoming communication from the Head End Unit 16 or two-way communication.

The ECP circuitry 20 re-enters its power saver mode: On command of the HEU 16 and subsequent loss of power on the train line wire 12; or, On the loss of power on the train line wire 12 with communication from the HEU 16 after a specified time-interval. The RF circuitry 30 is then allowed to enter its power saver mode when ECP is not active according to the EOT functional description above.

The following is an example of the implementation of the modes of operation and transition states.

There are four fundamental modes of operation:
Power Down Mode
Conventional RF EOT Mode
Combined ECP Transmit/RF Mode
Combined ECP/RF Mode In the Power Down Mode, the ECP/EOT 14 is not in use or "shutdown." It is in an ultimate power reduction state or "power off" condition. Each Wireless EOT circuitry 30 and ECP circuitry 20 are drawing minimal power. The marker light 34 shall be active given "low" ambient light conditions.

In the conventional RF/EOT mode, the RF circuitry 30 operates in the conventional radio mode either one-way or two-way operation. For any activation of the ECP/EOT 14, the conventional radio operating mode is active.

In the combined ECP Transmit/RF Mode, the conventional radio mode and an active ECP mode with cable-based communications is initiated. The differential factor of this mode of operation is that the ECP cable-based power and HEU Beacon is not and was not applied or detected.

In the combined ECP/RF Mode, the conventional radio mode and the fully active ECP mode are active. The fully active ECP mode is that on detection of ECP cable-based power and/or the HEU Beacon. In this mode, the battery 40 connection may be rerouted through the ECP PCB to the EOT circuitry 30 for charging and sense purposes.

The ECP circuitry 20 and the EOT circuitry 30 are integrated through the Activate Commands sent by the ECP circuitry 20 and a diagnostic message sent by the EOT circuitry 30 over 25. The Wireless EOT circuitry 30 has two states of operation other than control of the marker light 34. Simply, it is either in Power Down (power conservation) state or its state is Power Up with full RF operation. The EOT Circuitry 30 is in the Power Up state in all mode of operation of the ECP EOT Device, other than full Power Down Mode.

Figure 3:
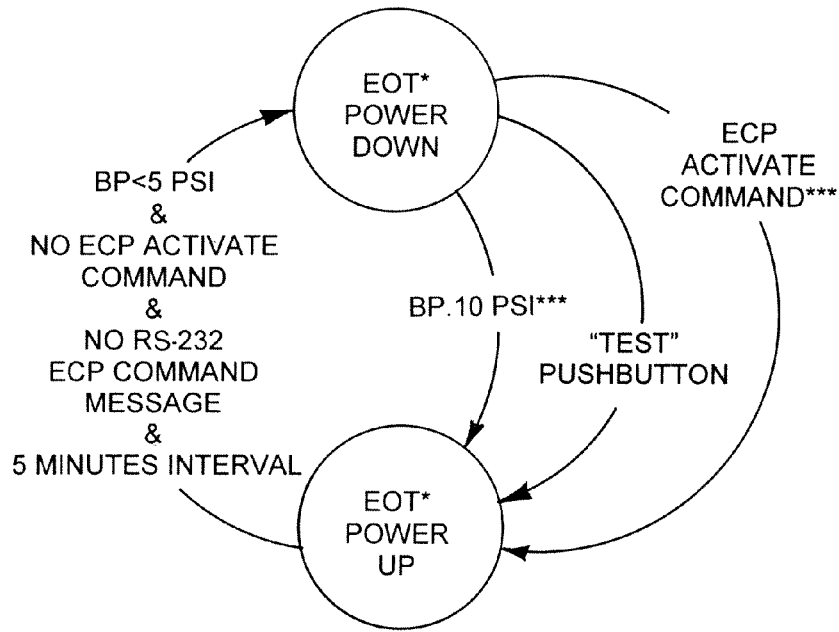
FIG. 3 is a transition diagram for the EOT/RF circuitry according to the present disclosure.

The EOT State Transitions are shown in FIG. 3. The typical or normal inputs to the EOT Circuitry 30 are a brake pipe pressure sensor 32 and the pushbutton 35. Conventional RF/EOT operation is initiated by either source. In the ECP/EOT 14, a hardware or software "activate" device or flag shall be in series with the brake pipe pressure sensor 32 input. The ECP circuitry 20 shall "open" the activate command on power up of ECP.

The EOT circuitry 30 shall immediately commence transmission of its EOT status message on receipt of the ECP command message. The EOT circuitry 30 shall cease transmission of its EOT status message on loss of detection of receipt of the ECP command message for five seconds. The EOT circuitry 30 shall have full RF end of train functionality when powered up. The EOT circuitry 30 shall remain in the Power Up state due to receipt of the ECP command message. The EOT circuitry 30 shall not enter its Power Down state until brake pipe pressure input has gone high (brake pipe reduced and ECP Activate Command removed) AND loss of receipt of ECP command message (five seconds) AND after an interval of five minutes.

Figure 4:
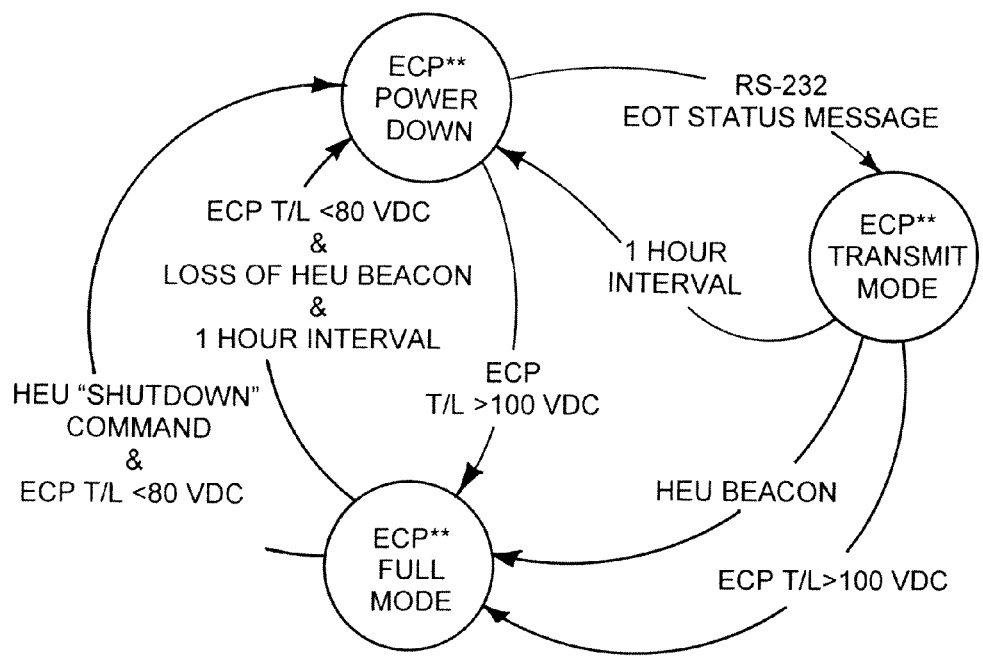
FIG. 4 is a transition diagram for the ECP circuitry according to the present disclosure.

The ECP State Transitions are shown in FIG. 4. The ECP circuitry 20 has three states of operation. The Power Down state or power conservation state, an ECP Transmit Mode and an ECP Full Mode. The normal course of events on train set up shall be the charging of brake pipe. As described above, the EOT circuitry 30 shall enter its Power Up state due to the sensed pressure in the brake pipe 10. The manual depression of the pushbutton 35 shall result in the EOT circuitry 30 sending a prescribed diagnostic message for a minimum of five seconds. The ECP circuitry 20 on receipt of the message shall transfer from the Power Down state to the ECP Transmit Mode state.

In the ECP Transmit Mode of operation, the ECP circuitry 20 will initiate communication on the ECP train line wire 12 (ECP's EOT Beacon), "open" its activate command output to the EOT circuitry 30 and commence sending its ECP command message. The ECP circuitry 20 shall not attempt to charge the battery or transfer any battery connection, if applicable.

In the ECP Transmit Mode, the ECP logic is looking for either the HEU Beacon message or the application of ECP train line power. If neither of these events occurs, the ECP logic shall initiate shutdown after a predefined interval, for example, one hour. The activate command shall "close" and the ECP command message shall cease to be sent. The EOT circuitry 30 shall then cease sending its ECP status message on loss of communication detection. The EOT circuitry 30 may transfer to its Power Down state if applicable.

If or when the ECP circuitry 20 receives a HEU Beacon or the application of ECP train line power, it will transition to the ECP Full Mode state from the ECP Transmit Mode state. In ECP Full Mode of operation the ECP circuitry 20 shall continue sending the ECP command message and "open" the activate command. These shall keep the EOT circuitry 30 in its Power Up state. Battery charging and sensing shall start operating through the ECP circuitry 20.

ECP circuitry 20 shall transfer directly from its Power Down state to ECP Full Mode state on the detection of ECP train line power. ECP circuitry 30 shall immediately start sending the ECP command message to the EOT circuitry 30. The EOT circuitry 30, monitoring for the ECP command message, shall start sending the EOT status message (within 5 seconds). The activate command shall "open" to the EOT circuitry 30 and thus initiate the Power Up of the EOT if was needed.

ECP circuitry 20 shall transfer from the Full Mode state to the Power Down state only. The trigger to transfer is the loss of the ECP train line power. However, there are two methods of power down. In the event of the loss (or failure to detect) of the HEU Beacon, ECP circuitry 20 shall transfer after AAR's prescribed one (1) hour interval. The other is an immediate transfer when the HEU Beacon has sent a "shutdown" command. The activate command shall "close" and the ECP command message shall cease to be sent. The EOT circuitry 20 shall cease sending the EOT status message on loss of receipt of the command message. The EOT circuitry 30 may transfer to its Power Down state if applicable.

EOT's logic and RF communications of the EOT circuitry 30 shall be initiated whenever ECP circuitry 20 is active and shall remain active due either to the receipt of the ECP command message or "open" of the activate command.

As discussed above, the activation of the ECP function or ECP Circuitry 20 is the specified application of power on the train line wire 12. There is a need to activate ECP operation to initiate communication to the train line wire 12 for train make-up and trouble shooting purposes in the absence of power on the train line wire 12. The prior art is that of a stand-alone ECP end-of-train device that has a dedicated pushbutton for this purpose. The combined ECP/EOT device 14 activates the ECP function, as well as the EOT function, by momentarily depressing pushbutton 35.

The EOT circuitry 30 immediately communicates to the ECP circuitry 20 whenever the pushbutton (PB) 35 is depressed. A "null" signal of an RS-232 message is momentarily raised to a "mark" level repeatedly, as prescribed for RS-232. Electronics within the ECP circuitry 20 recognizes these "mark" levels to activate from its power saver mode to full ECP mode of operation.

Figure 5:
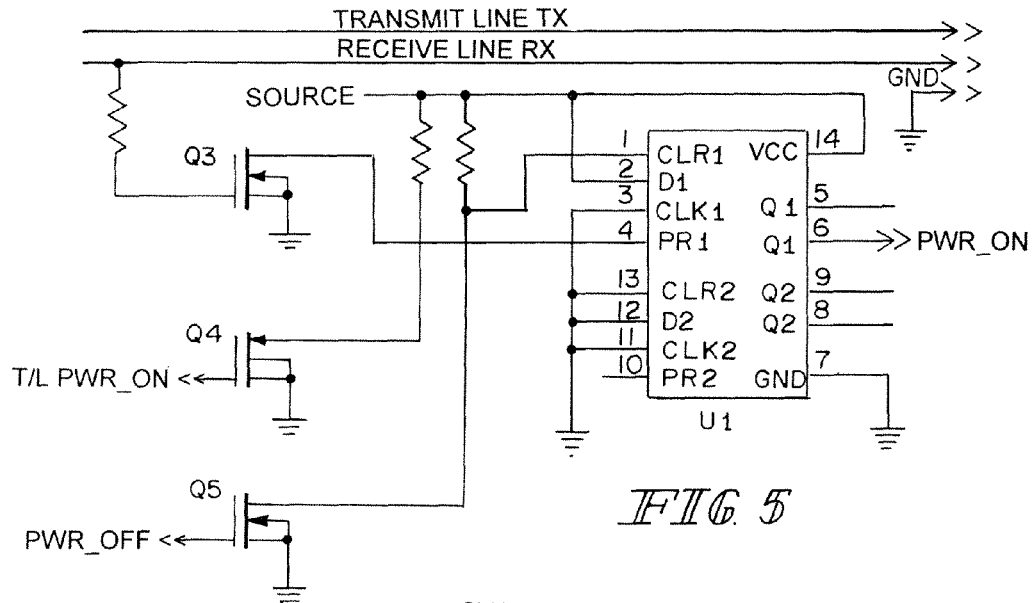
FIG. 5 is a schematic of the power up or activation circuitry according to the present disclosure.

FIG. 5 shows the elements of the ECP circuitry 20 to activate on receipt of communication. U1 is a flip flop with preset and clear and is used as a latch. The switched inputs from Q3 and Q4 to preset PR1, pin 4 of U1, provide the signal to activate. The input from Q5 to clear CLR1, pin 1 of U1, provide the signal to deactivate. The latch output is Q1, pin 5 of U1, is the signal (PWR_ON) for the ECP circuitry 20 to activate.

Initially the PWR_ON output is "low" or off and the ECP circuitry 20 is deactivated to its power saver mode of operation. Specified operation to activate is the determination of the application of power on the train line wire 12 that causes the T/L PWR_ON input to be "high." The T/L PWR_ON "high" causes switch Q4 to conduct resulting in the preset PR1, pin 4 of U1, to become "low." This results in Q1, pin 5 of U1, to become and latch "high", and such the PWR_ON output signal is activated.

Once activated, U1 maintains the PWR_ON to the "high" state even though the T/L PWR_ON input is removed or set to "low." Once activated, the ECP circuitry 20 remains active. Deactivation is controlled through logic of the ECP circuitry 20. To deactivate, each switch Q3 and Q4 must to "low." Even though "low," the flip flop logic of U1 maintains or latched the PWR_ON output "high". The ECP circuitry logic will set input PWR_OFF "high" when the desire to enter the power saver mode has be attained. The PWR_OFF "high" causes switch Q5 to conduct resulting in the clear CLR1, pin 1 of U1, to become "low." This results in Q1, pin 5 of U1, to become and latch "low," and such the PWR_ON output signal is deactivated.

The present ECP/EOT device allows for the ECP circuitry 20 to activate on the receipt of RS-232 communications as from the EOT circuitry 30 on connection 25. An RS-232 message is a series of pulses that enter on the receive line RX. These "high" pulse signals are input to switch Q3 causing Q3 to conduct, resulting in the preset PR1, pin 4 of U1, to become "low." This results in Q1, pin 5 of U1, to become and latch "high," and such the PWR_ON output signal is activated.

Operation of an ECP train is the requirement for end-to-end communication from the Combined ECP/EOT 14 with the HEU 16 over the train line wire 12. The arming function of the EOT operation is capable through the train line wire communication without the need of a second operator located at the Combined ECP/EOT 14.

Once two-way communication is established from the HEU 16 to the ECP circuitry 20 of the combined ECP/EOT 14, the arming function may be performed. Selection of the arming function as an option of the HEU 16 sends a communication over the train line wire 12 to the ECP circuitry 20. The ECP circuitry 20 relays this request to the EOT circuitry 30. The EOT circuitry 30 interprets this request the same as that of an operator momentarily depressing PB 35. The arming function is completed through the normal acknowledge sequence required of the CDU 18.

The arming function may fully be automated by the addition of an "arm start" connection from the HEU 16 to the CDU 18. Once two-way communication is established from the HEU 16 to the ECP circuitry 20 the arming function is automatically initiated and completed as long as the devices are healthy and functioning without the need of an operator prompt either at the combined ECP/EOT 14, the CDU 18 and/or the HEU 16.

A feature of the arming device is to allow the operation of the EOT's emergency valve (EMV) 33. Once two-way communication has been established from the HEU 16 to the ECP circuitry 20, control of the EMV 33 is made through the logic of the ECP circuitry 20 or, receipt of message from the HEU 16 or, receipt of message from any ECP controller connected to the train line wire 12, whereas is communicated to the EOT circuitry 30 to initiate its emergency sequence.

Figure 6:
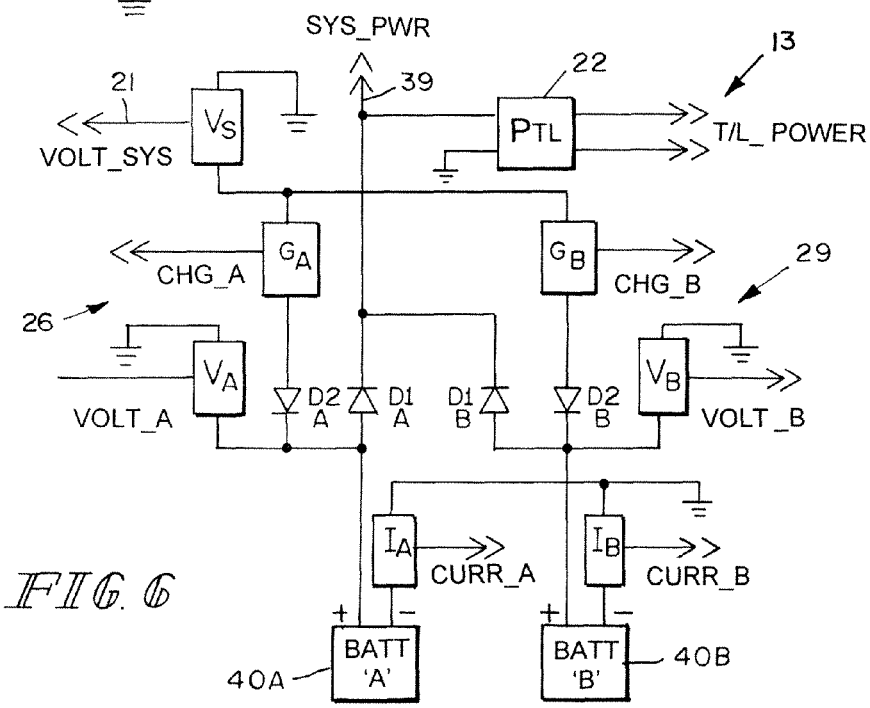
FIG. 6 is a schematic of the power management circuitry according to the present disclosure.

The EOT function requires a battery, and typically two, for operation over a period of time. FIG. 6 show the elements of the power management circuit 26 for the batteries 40 for the combined ECP/EOT 14. In the absence of power on the train line wire (T/L_PWR), system power (SYS_PWR) is available to each the EOT and ECP circuitries from the parallel connections of battery A (BATT "A") 40A and battery B (BATT "B") 40B. In the event that one battery carries a higher charge than the other, diode 1 (D1 A or B) protects the higher charged battery from discharging into the lower charged battery. Voltage level of the system power (SYS_PWR) is available to the logic of the ECP circuitry 20 through monitor circuit VS as output VOLT_SYS.

When power is available on the train line wire (T/L_PWR), system power (SYS_PWR) is converted by Power Converter PTL-22. The batteries do not need to power the system except for extreme surge requirements.

Each battery has a distinct input and output for the need to charge from T/L_PWR. Each battery is logic controlled separately from the other for charging. Outputs to the ECP logic are: Circuitry to monitor battery voltage level (V A and B) as logic input VOLT_A and B; and, Circuitry to monitor the battery current output level (I A and B) as logic input CURR_A and B. Input from the ECP logic is the circuitry to control the charge level (G A and B) as logic output CHG_A and B. The ECP logic controls the input CHG_A/B to that feedback of CURR_A/B, VOLT_A/B, VOLT_SYS and ambient temperature (not shown) to determine the optimized charging level for each battery.

Individual control for battery charging eliminates the damage due to unevenly charged batteries, a dead battery, degraded battery or missing battery. Controlled individually, the system may be restored to use as quick as the better performing battery's charge is restored.

The power applied to the train line wire 12 is nominally 230 volts direct current. The requirements of an ECP system are to charge the battery(s) from this source when greater than a minimum level (80 volts DC). Traditionally the battery must be removed from the end of train device to charge. Although the battery may be charged from power on the train line wire 12, there is still the need to charge independently of the ECP operation. This may be required as a minimum charge is required to move an ECP train and it is not desirable to wait for the battery to charge on train installation.

The Power Converter PTL 22 is arranged to accept utility power for operation and/or charging. Utility power may be either 115 volts, alternating current, 60 cycle (VAC) or 250 VAC, 50 cycle as typical European. This allows the battery 40 to be charged by simply applying an adapter cable from a typical household plug to the ECP train line plug. It is not necessary to disassemble and remove the battery from the end of train device. It is not necessary to have a separate bench charging device for batteries. This method reduces the likely application of uneven charged batteries as mix-and-match does not occur.

Although the present device has been described and illustrated in detail, it is to be clearly understood that this is done by way of illustration and example only and is not to be taken by way of limitation. The system was designed for use in AAR compliant countries and as an example of implementation, but the device and system is applicable to other standards. The scope of the present device is to be limited only by the terms of the appended claims.

What is claimed:

1. An end of train device for an electrically controlled pneumatic (ECP) brake system, the end of train device comprising:
   a radio transceiver for wireless communication;
   a sensor for sensing pressure in a brake pipe of a train when the end of train device is connected to the brake pipe;
   a valve for selectively connecting the brake pipe of the train to atmosphere when activated and when the end of train device is connected to the brake pipe;
   a manual switch;
   a first controller connected to the radio transceiver, sensor, valve and switch and controlling the radio transceiver and the valve;
   a wire transceiver for wire communication over an electrical train line wire when the end of train device is connected to the train line wire;
   a second controller connected to and controlling the wire transceiver; and
   the first and second controllers being connected to each other and controlling the radio transceiver to be active whenever the wire transceiver is active.

2. The end of train device of claim 1, wherein the second controller activates the wire transceiver in response to an electrically controlled pneumatic ECP command signals from at least one of the radio transceiver and the wire.

3. The end of train device of claim 2, wherein the second controller deactivates the wire transceiver in response to ECP commands and the first controller maintains the radio transceiver active if a minimum pressure is sensed in the brake pipe.

4. The end of train device of claim 2, wherein the ECP command signals on the wire includes a predetermined voltage on the wire.

5. The end of train device of claim 1, wherein the second controller activates the wire transceiver in response to electrically controlled pneumatic ECP command signals from the first controller which are in response to at least one of the radio transceiver receipt of ECP commands and the manual switch.

6. The end of train device of claim 5, wherein the second controller deactivates the wire transceiver if the ECP command signals from the first controller is in response to the manual switch and if the wire being electrically controlled pneumatic ECP active is not detected by the second controller after a preset time period.

7. An end of train device for an electrically controlled pneumatic (ECP) brake system, the end of train device comprising:
 a radio transceiver for wireless communication;
 a sensor for sensing pressure in a brake pipe of a train when the end of train device is connected to the brake pipe;
 a valve for selectively connecting the brake pipe of the train to atmosphere when activated and when the end of train device is connected to the brake pipe;
 a manual switch;
 a first controller connected to the radio transceiver, sensor, valve and switch and controlling the radio transceiver and the valve;
 a wire transceiver for wire communication over an electrical train line wire when the end of train device is connected to the train line wire;
 a second controller connected to and controlling the wire transceiver;
 the first and second controllers being connected to each other and controlling the radio transceiver to be active whenever the wire transceiver is active; and
 wherein the second controller activates and deactivates the wire transceiver in response to electrically controlled pneumatic ECP commands and the first controller activates the radio transceiver when the wire transceiver is activated if the radio transceiver is not activated and maintains the radio transceiver active if a minimum pressure is sensed in the brake pipe after the wire transceiver is deactivated.

8. The end of train device of claim 1, wherein the first controller activates the valve to connect the brake pipe to atmosphere in response to an emergency signal from at least one of the radio transceiver and the first controller which is responsive to the emergency signal from the wire transceiver.

9. The end of train device of claim 1, including a pair of batteries connected to a power source terminal for the end of train device; and a power management circuit controlling individually the charging of the batteries from the wire when the end of train device is connected to the train.

10. The end of train device of claim 9, wherein the power management circuit monitors the voltage and current of each battery.

11. The end of train device of claim 9, wherein the power management circuit individually isolates the batteries from the power source terminal.

12. The end of train device of claim 9, wherein the power management circuit includes a power converter connecting the wire and the power source terminal.

13. The end of train device of claim 12, wherein the power converter is adapted for train line voltages and public utilities voltages.

14. An end of train device for an electrically controlled pneumatic brake system, the end of train device comprising:
 a radio transceiver for wireless communication;
 a wire transceiver for wire communication over a train line wire when the end of train device is connected to the train line wire;
 a controller controlling the transceivers;
 a pair of batteries connected to a power source terminal for the end of train device; and
 a power management circuit controlling individually the charging of the batteries from the train line wire when the end of train device is connected to the train.

15. The end of train device of claim 14, wherein the power management circuit monitors the voltage and current of each battery.

16. The end of train device of claim 14, wherein the power management circuit individually isolates the batteries from the power source terminal.

17. The end of train device of claim 14, wherein the power management circuit includes a power converter connecting the train line wire and the power source terminal.

18. The end of train device of claim 17, wherein the power converter is adapted for train line voltages and public utilities voltages.

* * * * *